W. W. FULLER.
COMBINED STALK-CUTTER AND HAY-RAKE.

No. 190,484. Patented May 8, 1877.

WITNESSES:
Chas. Nida
J. H. Scarborough

INVENTOR:
W. W. Fuller
BY
ATTORNEYS.

N. PETERS, PHOTO-LITHOGRAPHER, WASHINGTON, D. C.

UNITED STATES PATENT OFFICE.

WILLIAM W. FULLER, OF ELMIRA, ILLINOIS.

IMPROVEMENT IN COMBINED STALK-CUTTER AND HAY-RAKE.

Specification forming part of Letters Patent No. 190,484, dated May 8, 1877; application filed February 3, 1877.

*To all whom it may concern:*

Figure 1:
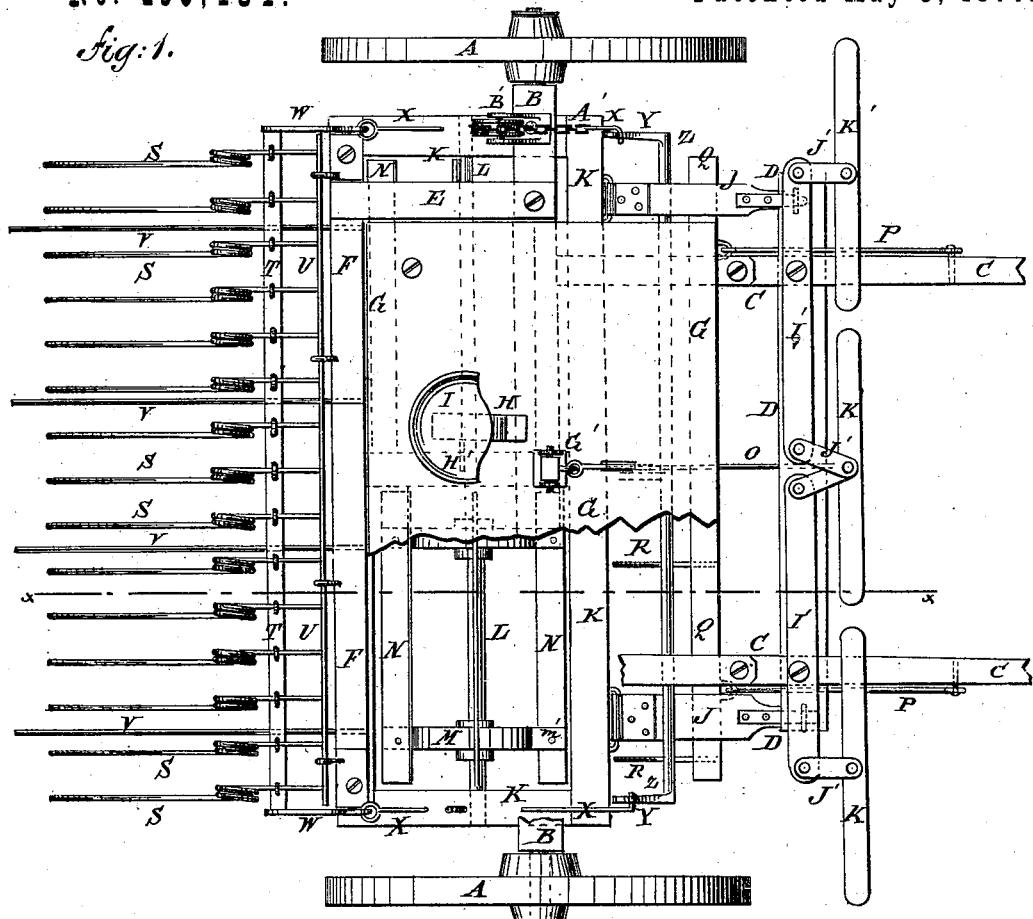
Figure 2:
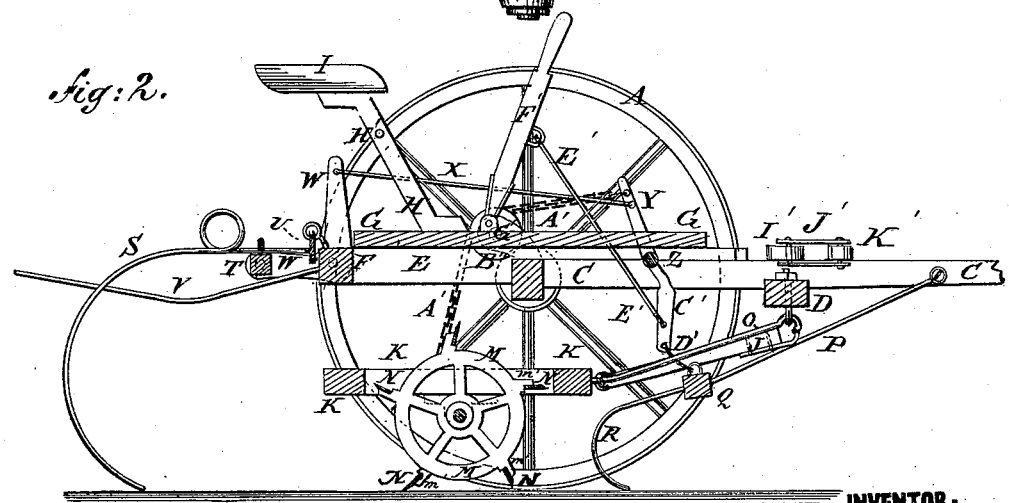

Be it known that I, WILLIAM W. FULLER, of Elmira, in the county of Stark and State of Illinois, have invented a new and useful Improvement in Combined Stalk-Cutter and Hay-Rake, of which the following is a specification:

Figure 1 is a top view of my improved machine. Fig. 2 is a vertical section of the same, taken through the line $x\ x$, Fig. 1.

Similar letters of reference indicate corresponding parts.

The object of this invention is to furnish an improved machine which shall be so constructed that it may be readily adjusted for use as a stalk-cutter, or as a hay-rake, and which shall be simple in construction, and convenient and effective in use in either capacity.

The invention will first be described in connection with the drawing, and then pointed out in the claims.

A are the wheels, which revolve upon the journals of the axle B. To the forward side of the axle B are rigidly attached the rear ends of the thills C, which are connected by a cross-bar, D. To the axle B are rigidly attached the forward ends of two bars, E, to the rear ends of which is attached a cross-bar, F. To the axle B and thills C is attached the platform G, to which is attached the standard H of the driver's seat I. To the ends of the cross-bar D are hinged the forward ends of two bars, J, to the rear ends of which is hinged the front bar of a frame, K. To the side and center bars of the frame K are attached bearings, in which revolve the ends of two shafts, L. The shafts L are placed in line with each other, and to each of them are attached two wheels, M. Upon the rims of the wheels M are formed lugs $m'$, to which are bolted the knives N. The cutters L M N are revolved by contact with the ground, and are made heavy, so that their weight may press the knives N down with sufficient force to cut the stalks. To the center of the front bar of the frame K is attached a spring-rod, O, the forward end of which passes through a keeper attached to the center of the cross-bar D.

The spring-rod O prevents the frame K from tilting forward or back, while allowing it the necessary freedom of movement.

To the outer sides of the thills C are pivoted the forward ends of two rods, P, to the rear ends of which is attached a cross-bar, Q, to which are attached four (more or less) teeth, R, to strike against any stalks that may be lying across the rows, and turn them into such a position that they may be struck and cut by the knives N of the cutters L M N. S are the rake-teeth, which are curved into the proper shape, have coils formed in them, and their upper ends are passed through keepers attached to the cross-bar T, and are secured to cross-bar U. The cross-bar U is hinged at its upper edge to the cross-bar F of the frame by eyebolts or other convenient means. V are stationary fingers attached to the cross-bar F, and projecting between the rake-teeth S to push off the hay as the said rake-teeth S are raised. To the ends of the bar T are pivoted the ends of the rear arms of the bent levers W, which are pivoted at their angles to the ends of the cross-bar F. To the ends of the upper arms of the bent levers W are pivoted the ends of the rods X, the other ends of which are pivoted to the arms Y, formed upon, or rigidly attached to, the shaft Z. To the arms Y of the shaft Z are also attached the ends of the chains A', which pass over pulleys B', pivoted to supports attached to the axle B. The other ends of the chains A' are attached to the end bars of the frame K. To the center of the shaft Z is rigidly attached a downwardly-projecting arm, C', to the lower end of which is attached the end of a rope, chain, or rod, D', the other end of which is attached to the center of the bar Q of the stalk-adjuster Q R. To the arm C' is pivoted the lower end of the rod E', which passes up through a slot in the platform G, and its upper end is pivoted to the lever F'. The lever F' is hinged at its lower end to a support, G', (which is swiveled to the platform G,) so that its upper end may have a side movement to enable it to be swung in beneath a pin, H', attached to the seat-standard H, to lock it in place.

By this construction, the stalk-cutter L M N, the stalk-adjuster Q R, and the rake S T U can be raised and lowered by operating the lever F'.

To the thills C are pivoted two unequal-armed double-trees, I', the ends of the inner or longer arms of which are connected by short straps J', with the central whiffletree K'. The ends of the outer or shorter arms of the double-trees I' are connected by short straps J' with the side whiffletrees K', as shown in Fig. 1.

By this arrangement, one, two, or three horses may be attached to the machine without changing the arrangement of the double-trees and whiffletrees.

Having thus described my invention, I claim as new and desire to secure by Letters Patent—

1. The pivoted bars J, the frame K, the cutters L M N, and the spring-rod O, in combination with the front cross-bar D of the carriage, substantially as herein shown and described.

2. The combination of the chains A', attached centrally to the cutter-frame, the pulleys B', the arms and shaft Y C' Z, the rod E', and the lever F', with the frame K of the cutters L M N, the spring-rod O, and the carriage, substantially as herein shown and described.

WILLIAM W. FULLER.

Witnesses:
 WALTER M. FULLER,
 CLINTON FULLER.